J. L. ZANDER.
ELECTRIC RECORDER.
APPLICATION FILED JAN. 17, 1914.
1,104,949.
Patented July 28, 1914.
4 SHEETS—SHEET 1.
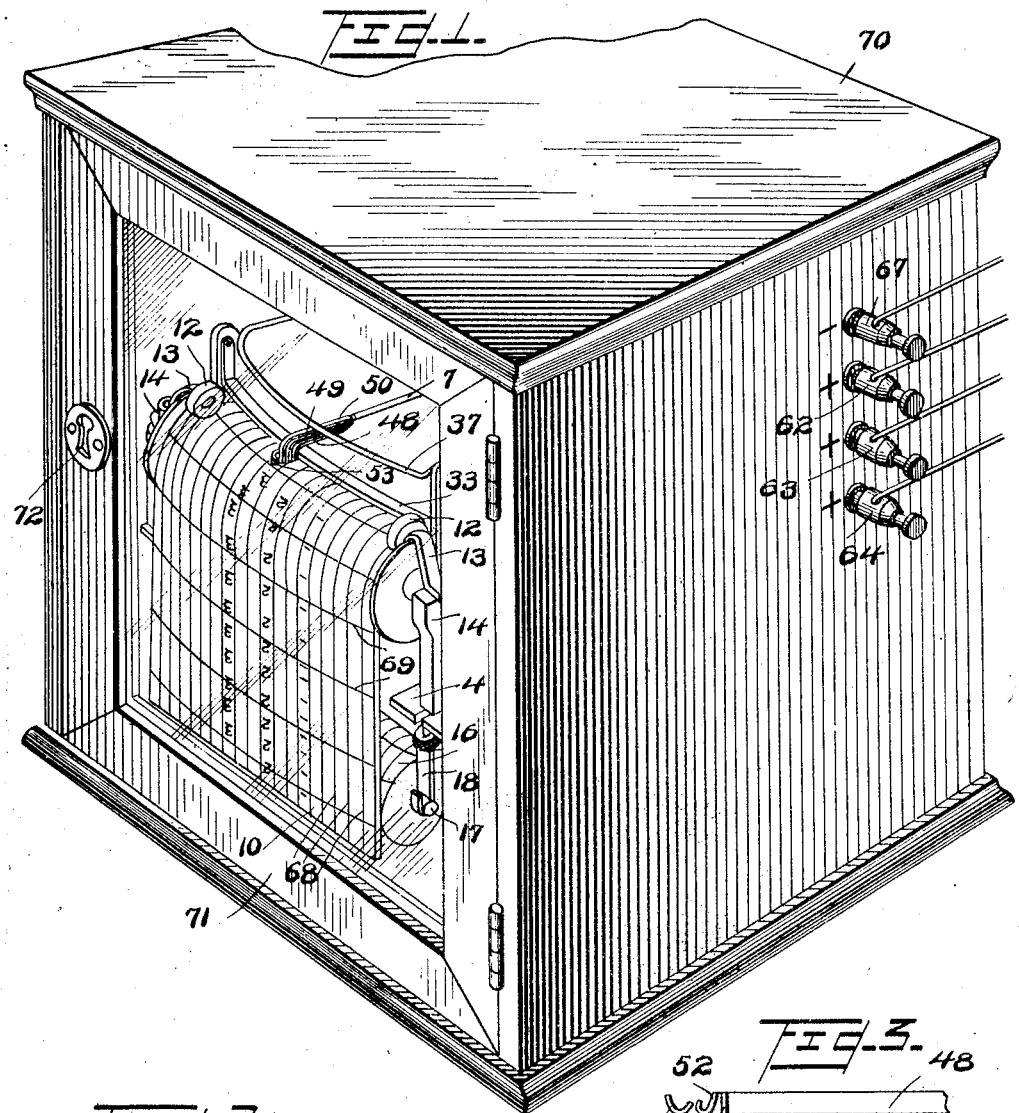
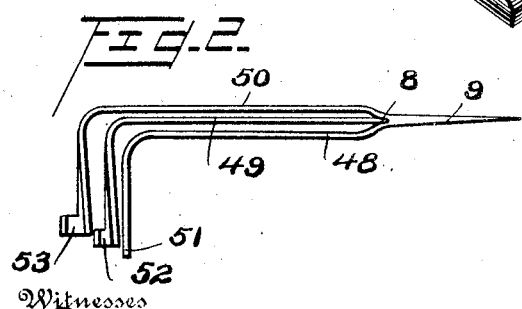
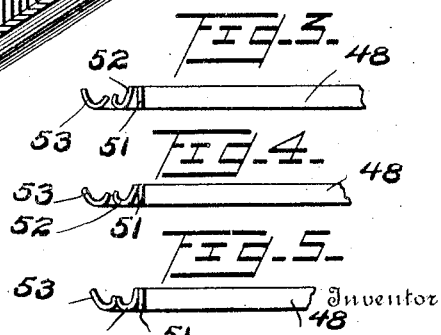
Witnesses
Inventor
John L. Zander
By Joshua R. H. Potts.
Attorney J. L. ZANDER.
ELECTRIC RECORDER.
APPLICATION FILED JAN. 17, 1914.
1,104,949.
Patented July 28, 1914.
4 SHEETS—SHEET 2.
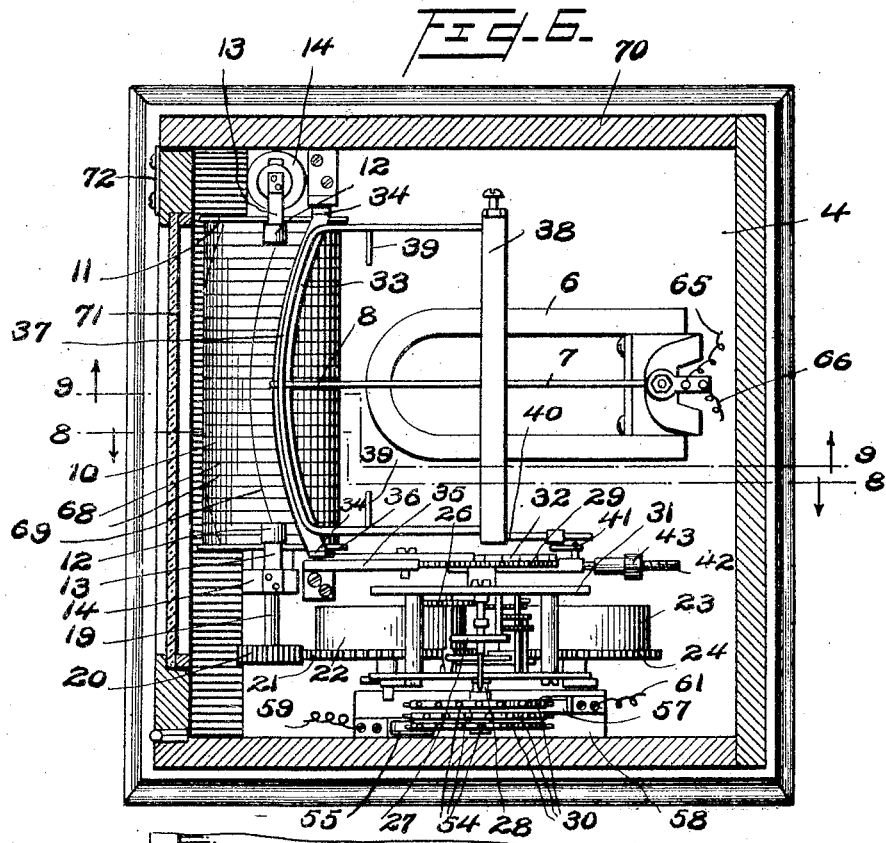
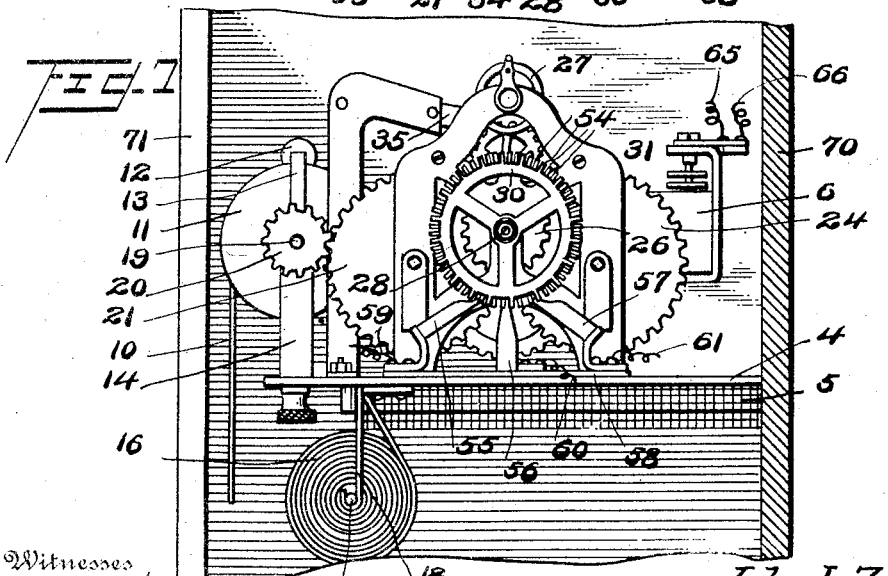
Witnesses
Inventor
John L. Zander
By Joshua R. H. Potts
Attorney

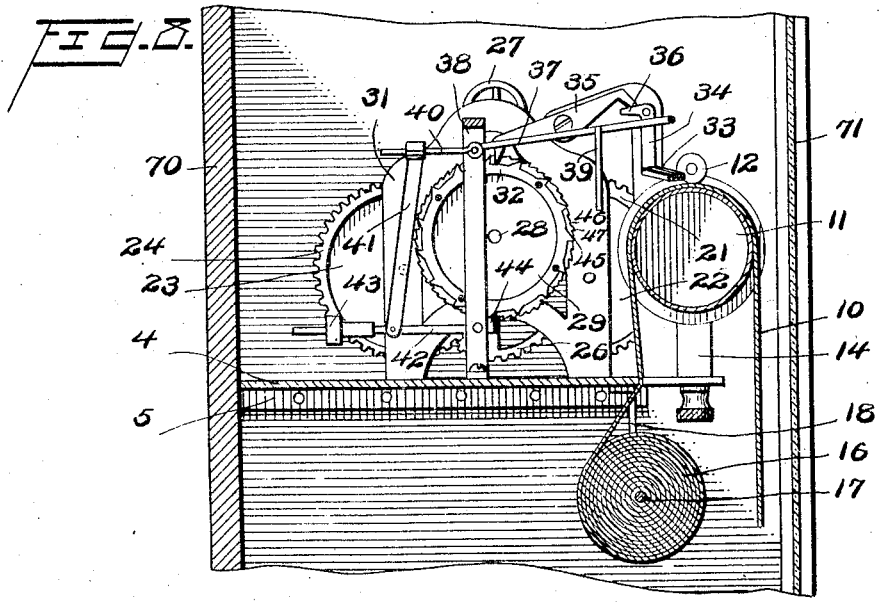
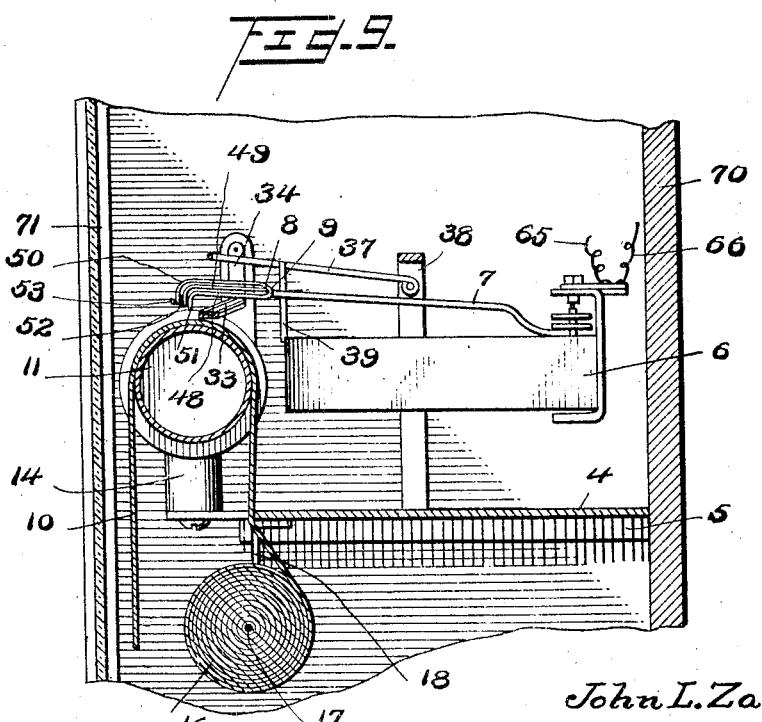

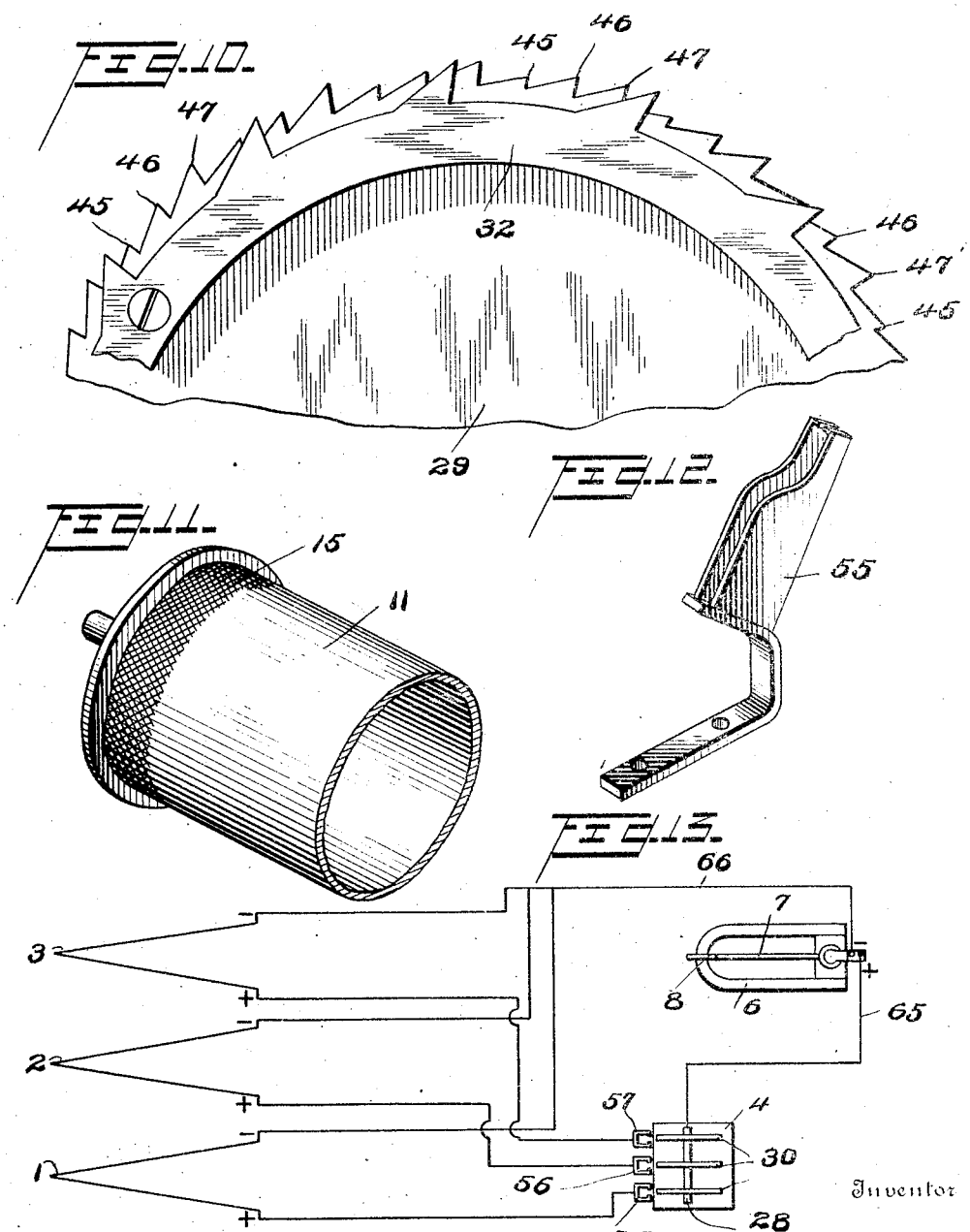

UNITED STATES PATENT OFFICE.

JOHN L. ZANDER, OF IRVINGTON, NEW JERSEY, ASSIGNOR TO CHARLES O. SANDER, OF IRVINGTON, NEW JERSEY.

ELECTRIC RECORDER.

1,104,949.  Specification of Letters Patent.  Patented July 28, 1914.

Original application filed November 7, 1912, Serial No. 729,922. Divided and this application filed January 17, 1914. Serial No. 812,652.

*To all whom it may concern:*

Be it known that I, JOHN L. ZANDER, a citizen of the United States, residing at Irvington, in the county of Essex and State of New Jersey, have invented certain new and useful Improvements in Electric Recorders, of which the following is a specification.

My invention relates to improvements in electric recorders, the object of the invention being to provide an improved mechanism which prints upon a moving chart a plurality of different characters, each character serving to measure a separate electric circuit, whereby the instrument records the measure in voltage or temperature in connection with a plurality of thermo-couples.

A further object is to provide, in connection with a galvanometer, mechanical means for printing upon a moving chart a plurality of different characters, and provide improved mechanical means for opening and closing the electric circuits, whereby each circuit is closed in regular order and the character representing each circuit is printed upon the chart when its circuit is closed, and the position of the printing device controlled by the galvanometer.

A further object is to provide a galvanometer indicator needle with an improved construction of printing device which consists of a plurality of spring-held characters which are moved into printing relationship with a chart in accordance with the pressure on the printing device, and said characters singly and together operating to print different characters on the chart.

A further object is to provide in combination with my improved printing device, improved mechanical means for inking the printing device, for opening and closing electric circuits, and improved means for exerting pressure on the printing device in accordance with the circuit which is closed so that at each closure of the same circuit, the same character will be printed on the chart.

This application is a division of my original application for patent on electric recorders, filed November 7, 1912, and given Serial No. 729,922. In the original application I have elected to cover my particular printing device, and in this divisional application, I have elected to cover the inking mechanism in its broad sense, in combination with the coöperating elements of the recorder.

With these and other objects in view, the invention consists in certain novel features of construction and combinations and arrangements of parts as will be more fully hereinafter described and pointed out in the claims.

In the accompanying drawings: Figure 1 is a perspective view illustrating my improvements. Fig. 2 is a view in side elevation on an enlarged scale illustrating my improved printing device. Figs. 3, 4, and 5 are bottom plan views on an enlarged scale of the printing device showing the same in its three different positions to form its three different characters. Fig. 6 is a view in cross section through the casing showing my improved mechanism in plan. Fig. 7 is a view in vertical section through the casing illustrating the mechanism in end elevation. Fig. 8 is a view in section on the line 8—8 of Fig. 6. Fig. 9 is a view in section on the line 9—9 of Fig. 6. Fig. 10 is a fragmentary view on an enlarged scale illustrating the arrangement of teeth controlling the printing device and the ink pad therefor. Fig. 11 is a fragmentary perspective view illustrating one end of the chart carrying drum. Fig. 12 is a perspective view of one of the electric contacts, and Fig. 13 is an electric diagram illustrating my improvements.

70 represents a casing having a transparent hinged door 71 normally secured in closed position by a lock 72, and in said casing a metallic base plate 4 is supported upon strips 5 secured to the sides of the casing. This base supports a galvanometer 6 having an oscillating indicating needle 7 which oscillates to measure voltage or the temperatures of thermo-couples, and on the free end of this indicating needle 7, I provide an improved printing device 8. A convenient method of attaching the printing device is to construct the pointer in the form of a tube and project the restricted end 9 of the printing device into the same. This printing device is adapted to print upon a moving chart 10 which passes over a cylindrical drum 11, and is held firmly upon the drum by means of rolls 12 connected to spring arms 13 fixed to the posts 14 which support the drum. The ends of the drum against which the chart is pressed by means of the rollers 12, are roughened as indicated at 15, so that the chart is firmly held against slipping and is uniformly fed from a supply roll 16 supported by a rod 17 in hangers 18 dependent from base plate 4.

The drum, as above stated, is supported by the posts 14, and one trunnion or stub 19 of the drum projects beyond the post, and has fixed thereto a pinion 20 which meshes with a gear 21 fixed to a spring case 22. A second spring case 23 has a large gear 24 thereon, and the gears 21 and 24 drive a train of gearing 26. This train of gearing is supported in a frame 31 and movement of the train of gearing is controlled by the ordinary balance wheel 27. The train of gearing drives a shaft 28, upon the outer end of which three wheels 30 are secured, and on the inner end of said shaft, a toothed wheel 29 is secured. The three wheels 30 control the opening and closing of the electric circuits and for convenience of description, and to distinguish them from other wheels, they shall be hereinafter termed "circuit closing wheels." On one side of the wheel 29, a toothed ring 32 is secured and this toothed ring controls the movement of an inking pad 33. The inking pad is curved in the arc of a circle concentric with the pivot point of indicating needle 7, and at its ends is connected to pivoted hangers 34, and normally hangs by gravity out of the path of movement of the printing device 8. A lever 35 is fulcrumed between its ends on the frame 31, and at one end bears against a finger 36 on one of the hangers 34, while the opposite end of this lever lies in the path of movement of the teeth on ring 32. This ring turns in a direction to bring the beveled face of the teeth against the end of lever 35, and when the lever 35 is engaged by one of the teeth 32, the lever 35 is operated to swing the inking pad into the path of movement of the printing device which will be hereinafter described.

The printing device is normally elevated by reason of the inherent elasticity in the needle 7, and is pressed downwardly by a U-shaped bail 37 pivotally supported at its ends in a frame 38 secured to base plate 4. The side members of this bail are provided with downwardly projecting fingers 39 which limit the lateral swinging movement of needle 7, and the intermediate portion of the bail is curved concentrically with the pivot point of the needle 7, so that regardless of the lateral position of the printing device, it will be engaged at the same point by the bail. This bail, at one side, is provided with a rearwardly projecting crank arm 40, and said arm 40 is connected by a link 41 with a lever 42. This lever 42 is fulcrumed near its forward end in the frame 38, and is provided at its screw-threaded rear end with an adjustable weight 43 to counterbalance the weight of the bail, hence relieving the clock mechanism of the weight of the bail. The forward shorter end of lever 42 is formed with a tooth 44 which is engaged by the teeth on wheel 29, and these teeth are of a peculiar arrangement illustrated on an enlarged scale in Fig. 10. In other words, the circular series of teeth are in the form of ratchet teeth, and are arranged in a series of three, varying in height, hence the wheel is provided with a circular series of teeth, every third tooth being alike, but arranged in sets of three, the first tooth 45 being the lowest, the next tooth 46 higher, and the next tooth 47 the highest and beginning again with a low tooth 45 and so on around the periphery of the wheel. This different depth of tooth varies the pressure upon the printing device, and this variation in pressure causes the printing device to form on the chart 10 different characters.

The printing device 8 comprises three angular spring members 48, 49, and 50 respectively, all integral at one end or fixed together where they join with the reduced end 9 to be projected into the tubular needle 7, but at their free ends, the said springs are apart and spring 48 normally projects an appreciable distance below the end of spring 49, and the latter normally projects an appreciable distance below the end of spring 50. The end of spring 48 constitutes a straight type 51. On the end of spring 49, a curved type 52 is provided, and a somewhat differently curved type 53 is provided on the end of spring 50. When only sufficient pressure is applied to the printing device to bring the type 51 into contact with the chart, a single bar will be printed on the chart which will resemble the numeral "1". When a greater pressure is applied, as for example, when one of the teeth 46 is operating the pressure device, not only type 51 will be moved into contact with the chart, but also type 52, and by reason of the fact that the springs are all joined at one point, the downward movement of the springs will cause them to come together at their printing end, so that a character somewhat resembling the numeral "2" will be printed on the chart. When the maximum pressure is applied, as for example, when the tooth 47 is in operative relation, the printing device will be forced downward so that all three of the type 51, 52, and 53 will come together and print on the chart a character resembling the numeral "3".

The three different positions of the printing device in its printing relationship to the chart are indicated in plan in Figs. 3, 4, and 5, and the particular character formed is controlled altogether by the downward movement of bail 37, this movement being controlled by the teeth 45, 46, and 47 as above explained. The circuit closing wheels 30 are provided around their peripheries with radially projecting pins 54, each wheel having a like number of pins, but the pins of the respective wheels having a lead over each other, so that none of the pins are in alinement. On the base 4, three approximately U-shaped spring contacts 55, 56, and 57 are located and are secured to a strip of insulation 58 which insulates them from each other and from the base. These contacts are connected by electric wires 59, 60, and 61 with binding posts 62, 63, and 64 respectively on the outside of the casing. It is to be understood that the three contacts 55, 56, and 57 are in the path of movement respectively of the three sets of pins 54 on the three wheels 30, so that the circuits through these contacts are closed in order when a pin passes between and engages the contact. The galvanometer is electrically connected to the ground or base 4 by means of a wire 65, while the opposite pole of the galvanometer is connected by a wire 66 with a binding post 67 on the casing.

In Fig. 13, I illustrate a simple form of electric diagram in which my improvements are shown in connection with three thermo-couples 1, 2, and 3, the positive pole of the respective couples being connected with the contacts 55, 56, and 57 respectively, and the negative pole of all of the couples connected with the negative pole of the galvanometer 6, and the positive pole of said galvanometer, electrically connected by means of the wire 65, and through the base 4 with the shaft 28 and the three wheels 30 thereon.

The chart 10 above referred to comprises a plurality of longitudinal lines 68 crossed by curved lines 69. These lines are curved so that regardless of the swinging movement of the indicating needle 7, the printing device will print properly between the lines.

The operation is as follows: The inking pad 33 is normally out of the path of movement of the printing device 8, and we will assume that the wheels 30 are in a position to move one of the pins into engagement with contact 55, which controls the circuit to the thermo-couple 1. As soon as this contact is made, the electric circuit is closed between the thermo-couple 1 and the galvanometer, so that the needle 7 of the galvanometer will swing laterally to measure the current and will stop at such lateral position. At this time, one of the teeth 45 will, through the medium of the mechanism above described, cause the bail 37 to move downwardly and exert a pressure upon the printing device 8, but this pressure will be only sufficient to bring type 51 into contact with the chart 10, it being understood that the chart is slowly or continuously moving, hence upon the chart the type 51 will record the numeral 1 and indicate upon the chart the temperature or voltage of the thermo-couple 1. As soon as this is done, the circuit to the thermo-couple is broken as the pin passes contact 55. Next, a pin on another of the wheels 30 will engage contact 56 and close the circuit through thermo-couple 2. As before, the needle 7 will swing laterally to measure the current and as before the bail 37 will move downwardly, but this time, by reason of the fact that the movement of the bail is controlled by a tooth 46, the print device will receive a downward pressure sufficient to move type 52 against the chart as well as type 51, and as these two types come together, they will print upon the chart, the numeral 2 as indicated in plan in Fig. 4. This circuit is then broken and one of the pins next engages contact 57, so that the electric circuit is closed through thermo-couple 3. As before, needle 7 will swing laterally to measure the current, and bail 37 will move downwardly, but this time a tooth 47 controls the downward pressure and gives to the printing device its maximum movement, which brings all three of the type 51, 52, and 53 together as indicated in Fig. 5, and upon the chart the numeral 3 will be printed.

The operation above described is repeated again and again at regular intervals, so that an examination of the chart at any time will show exactly the fluctuations in the different circuits. At regular intervals, the teeth on ring 32 will cause the ink pad 33 to swing outwardly into the path of movement of the printing device as above explained, so that the type 51 and 52 will receive the ink from the pad when pressed downwardly by the bail 37. At such time, of course the printing device will not print upon the chart, but the teeth are so arranged that the inking of the type is uniformly accomplished so that there is no appreciable skip in the recording of any particular circuit.

It will be noted that by the arrangement of teeth on ring 32 with reference to teeth 45, 46, and 47, the inking pad 33 is moved under the printing device 8 at every fourth depression of the latter. This prevents the recording of each circuit every third time, so that a skip will occur in each column every third time, but such skips are not noticeable because of the close proximity of the characters.

While I have described my improved printing device as forming numerals 1, 2, and 3, it is of course to be understood that other characters might be so formed, and while I have described my invention in connection with three circuits, it is to be understood that this number may be varied so that the recorder may be adapted for various uses, but will accurately record the measurements in various circuits.

While I have referred to the means for marking the record as a printing device, the same in its broadest sense is a pen supplied by ink from the pad, and hence in the claims I have used this term "pen" in the broadest sense to cover any marking or printing device supplied by ink to mark the record.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination in a graphic recorder of a chart supporting member, a movably mounted ink pad, a pen mounted to normally be out of engagement with the chart on said member, mechanism for periodically interposing the inking pad between the chart and the pen, with a device for periodically actuating the pen to cause it to engage the chart at certain times and to cause it to engage the ink pad at other times.

2. The combination in a graphic recorder of a chart supporting roller, mechanism for turning said roller, a movably supported ink pad adjacent the roller, a pen mounted to form a record on a chart upon the roller, mechanism for periodically moving the ink pad into the line of movement of the pen, and a device for moving the pen alternately into engagement with the chart and with the ink pad.

3. The combination in a graphic recorder of a chart supporting structure, a pen mounted to form a record on a chart upon said structure, an ink carrier, means for periodically interposing said carrier between the pen and the chart, and means for periodically moving the pen into an operative position, the same consisting of a member operative on said pen, and a second member for controlling the operation of the first member.

4. The combination in a graphic recorder of a chart supporting member, a pen, means for periodically causing the pen to form a record on a chart carried by said member, the same including a ratchet wheel having teeth of different heights, and an inking member for periodically supplying ink to the pen.

5. The combination with a movable record, a laterally swinging pen, a pivoted bail adapted to engage and depress the pen at any position of its lateral movement, a chart carrier below the pen, an inking pad, and means for periodically moving the inking pad into position below the pen, substantially as described.

6. In an apparatus of the character described, a recording device, means for periodically causing said device to form a record, said means comprising a ratchet wheel having teeth of different heights and mechanism including a movable inking member and a second ratchet wheel for periodically causing said inking member to supply ink to the recording device.

In testimony whereof I have signed my name to this specification in the presence of two subscribing witnesses.

JOHN L. ZANDER.

Witnesses:
  EUGENE MUNSCH,
  JOHN STELZER.